US012608932B2

(12) United States Patent
Nagatani et al.

(10) Patent No.: US 12,608,932 B2
(45) Date of Patent: Apr. 21, 2026

(54) DAMAGE DETERMINATION INFORMATION SYSTEM, SERVER DEVICE, TERMINAL APPARATUS, AND PROGRAM

(71) Applicant: FUJIFILM Corporation, Tokyo (JP)

(72) Inventors: Koki Nagatani, Tokyo (JP); Kyota Watanabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 441 days.

(21) Appl. No.: 18/186,757

(22) Filed: Mar. 20, 2023

(65) Prior Publication Data

US 2023/0230371 A1     Jul. 20, 2023

Related U.S. Application Data

(63) Continuation of application No. PCT/JP2021/034254, filed on Sep. 17, 2021.

(30) Foreign Application Priority Data

Sep. 23, 2020     (JP) ................................. 2020-158671

(51) Int. Cl.
*G06V 20/10*          (2022.01)
*G06Q 50/26*          (2012.01)
(Continued)

(52) U.S. Cl.
CPC ......... *G06V 20/176* (2022.01); *G06Q 50/265* (2013.01); *G06V 10/764* (2022.01); *G06V 10/774* (2022.01); *G06V 10/95* (2022.01)

(58) Field of Classification Search
CPC .... G06V 20/176; G06V 10/95; G06V 10/774; G06V 10/764; G06Q 50/265
See application file for complete search history.

(56) References Cited

U.S. PATENT DOCUMENTS 9,805,261 B1 * 10/2017 Loveland .................. B64F 5/60
9,846,915 B2 * 12/2017 Howe ........................ G06T 7/11
(Continued)

FOREIGN PATENT DOCUMENTS

JP     2018-165906 A     10/2018
JP     2019-175015 A     10/2019
JP     2020-052795 A      4/2020

OTHER PUBLICATIONS

"Decision of Refusal" Office Action issued in JP 2022-551947; mailed by the Japanese Patent Office on Sep. 17, 2024.
(Continued)

*Primary Examiner* — Manav Seth
(74) *Attorney, Agent, or Firm* — Studebaker Brackett PLLC

(57)          ABSTRACT

Provided are a damage determination information system, a server device, a terminal apparatus, and a program that can realize at least one of the improvement of the convincing feeling for a damage determination result, the reduction of an investigation cost, or the decrease of fluctuation of the damage determination results by a plurality of investigators. A provisional damage determination result is acquired, and a server device extracts a plurality of disaster images related to the provisional damage determination result from a disaster image database (15) and displays the extracted disaster image on a display device of a terminal apparatus. Input of an instruction for settling the damage determination result is received from the terminal apparatus that displays the disaster image, and the settled damage determination result is registered in a damage investigation result database (17).

14 Claims, 8 Drawing Sheets

(51) Int. Cl.

| | |
|---|---|
| *G06V 10/764* | (2022.01) |
| *G06V 10/774* | (2022.01) |
| *G06V 10/94* | (2022.01) |

(56) References Cited

U.S. PATENT DOCUMENTS

| | | | | |
|---|---|---|---|---|
| 10,102,428 | B2 * | 10/2018 | Loveland | G06V 10/235 |
| 10,181,079 | B2 * | 1/2019 | Labrie | G06V 20/176 |
| 10,511,676 | B2 * | 12/2019 | Howe | G06T 7/0004 |
| 10,679,339 | B2 * | 6/2020 | Yamagishi | G06T 3/14 |
| 10,692,160 | B1 * | 6/2020 | Lyons | G06V 20/17 |
| 10,796,394 | B2 * | 10/2020 | Wani | G06N 20/10 |
| 10,909,647 | B2 * | 2/2021 | Wani | G06Q 30/0283 |
| 10,984,293 | B2 * | 4/2021 | Guo | G06V 10/25 |
| 11,315,218 | B2 * | 4/2022 | Matsumoto | H04N 5/2628 |
| 11,521,273 | B2 * | 12/2022 | Jakka | G06Q 30/0205 |
| 11,538,127 | B1 * | 12/2022 | Lecocke | H04L 67/12 |
| 11,631,165 | B2 * | 4/2023 | Lutich | G06V 10/26 |
| | | | | 382/180 |
| 11,636,581 | B2 * | 4/2023 | Ranca | G06N 3/049 |
| | | | | 382/157 |
| 11,966,981 | B2 * | 4/2024 | Liu | G06V 20/17 |
| 2016/0027051 | A1 * | 1/2016 | Gross | G06V 20/20 |
| | | | | 705/14.54 |
| 2016/0048934 | A1 * | 2/2016 | Gross | G06V 10/40 |
| | | | | 705/313 |
| 2020/0065632 | A1 * | 2/2020 | Guo | G06V 10/82 |

OTHER PUBLICATIONS

An Office Action mailed by the Japanese Patent Office on Jun. 10, 2024, which corresponds to Japanese Patent Application No. 2022-551947 and is related to U.S. Appl. No. 18/186,757.

International Search Report issued in PCT/JP2021/034254; mailed Nov. 30, 2021.

International Preliminary Report on Patentability (Chapter I) and Written Opinion of the International Searching Authority issued in PCT/JP2021/034254; issued Mar. 28, 2023.

* cited by examiner

DAMAGE DETERMINATION INFORMATION SYSTEM, SERVER DEVICE, TERMINAL APPARATUS, AND PROGRAM

CROSS-REFERENCE TO RELATED APPLICATIONS

The present application is a Continuation of PCT International Application No. PCT/JP2021/034254 filed on Sep. 17, 2021 claiming priority under 35 U.S.C § 119(a) to Japanese Patent Application No. 2020-158671 filed on Sep. 23, 2020. Each of the above applications is hereby expressly incorporated by reference, in its entirety, into the present application.

BACKGROUND OF THE INVENTION

1. Field of the Invention

The present invention relates to a damage determination information system, a server device, a terminal apparatus, and a program, and more particularly relates to an information processing technology of supporting a determination of a degree of damage to a disaster-stricken building.

2. Description of the Related Art

In a case in which a disaster occurs, the local government will conduct a residence damage certification investigation to determine a degree of damage to a disaster-stricken house in order to issue a disaster certificate. JP2018-165906A discloses a damage investigation system in which even a person who does not have the knowledge to determine a degree of damage to a disaster-stricken object can collect information necessary to certificate the degree of damage to the disaster-stricken object in a disaster-stricken area, and can transmit the information to a place that has not stricken from the disaster.

SUMMARY OF THE INVENTION

In the residence damage certification investigation for the purpose of issuing the disaster certificate, the damage of the building is decided by integrating investigation items subdivided by a structure or a portion of the building according to "disaster damage certification criterion" and "damage certification criterion operation guidelines for residence related to disaster" shown by the Cabinet Office. Therefore, it is not practical for a general employee who conducts the investigation to grasp all of these items and criteria. Moreover, there is ambiguity in a determination criterion for the degree of damage as a problem of the damage determination.

As a result, the investigator is uncertain about the classification determination of the degree of damage, and it is necessary to confirm with the coordinator or to obtain the agreement of the investigation team in order to decide the determination, so that the investigation time per case is prolonged.

Moreover, the ambiguity of the determination criterion of the degree of damage also affects the convincing feeling for the determination result of a resident. Reconstruction support enjoyed by the resident may differ depending on the determination result of the degree of damage, and in a case in which the materials that can convince the resident of the determination result cannot be provided, the reinvestigation occurs, so that an investigation cost of the local government is increased.

The residence damage certification investigation includes a primary investigation in which the investigator determines the degree of damage only from the appearance of the building and a secondary investigation in which the degree of damage is determined after confirming an indoor condition in the presence of a disaster-stricken resident based on a request of reinvestigation from a disaster-stricken person. In a case in which the resident is not convinced of a result of the primary investigation conducted by the local government, a secondary investigation will be conducted.

However, the secondary investigation takes time twice the primary investigation, and in a case in which the number of conducted investigations is large, the issuance of the disaster certificate is also delayed, so that both the local government and the resident have a heavy burden. Moreover, the number of cases in which the determination result of the primary investigation is overturned by the secondary investigation is about 30% (less than 40%), although it depends on the type of disaster and the area.

In the Kumamoto earthquake in 2016, the number of conducted secondary investigations is 57,251 cases, which are about 30% of the total number of residence damage certification investigations, and the cases in which the determination is overturned by the conduction of the secondary investigation is less than 40%. It is desirable for the local government to reduce the conduction of the secondary investigation for the house of which the determination is not overturned even in a case in which the secondary investigation is conducted.

On the other hand, from the perspective of the resident, since the information for determining the degree of damage of the house is not enough and the damage determination result also affects an amount of support money, there are many cases in which the resident applies the secondary investigation first of all. Therefore, from the perspective of the local government, the object is to provide the resident with objective information regarding the determination of the degree of damage of the disaster-stricken residence and reduce the cases leading to the application for the conduction of the secondary investigation. In this regard, JP2018-165906A does not disclose a measure for obtaining the damage determination result with the convincing feeling by omitting the investigation itself.

The present invention has been made in view of such circumstances, and is to provide a damage determination information system, a server device, a terminal apparatus, and a program that can realize at least one of the improvement of the convincing feeling for the damage determination result, the reduction of the investigation cost by the local government or the like, or the decrease of fluctuation of the damage determination results by a plurality of investigators.

An aspect of the present disclosure relates to a damage determination information system comprising a server device that manages a damage determination result of a disaster-stricken building and a disaster image which corresponds to the damage determination result and in which the disaster-stricken building is imaged, and a terminal apparatus connected to the server device via a network, in which the server device includes a first processor, and a disaster image database that stores the damage determination result and the disaster image in association with each other, the terminal apparatus includes a second processor, a display device, and an input device, the first processor acquires a provisional damage determination result, extracts a plurality of the disaster images related to the provisional damage determination result from the disaster image database based on the acquired provisional damage determination result, and provides the extracted plurality of disaster images to the terminal apparatus, the second processor displays the extracted plurality of disaster images on the display device, and receives input of an instruction for settling the damage determination result from the input device, and the first processor registers the settled damage determination result in a damage investigation result database based on an instruction from the terminal apparatus that displays the plurality of disaster images on the display device.

With the damage determination information system according to the present aspect, since the plurality of disaster images of the degree of damage related to the acquired provisional damage determination result are displayed on the display device of the terminal apparatus, the user can confirm the validity of the provisional damage determination result with reference to these displayed images and can register the damage determination result in the damage investigation result database after being convinced of the validity.

The terminal apparatus may be carried by, for example, an investigator who conducts the damage investigation, or may be installed at a window of the local government and used to explain the investigation result to the disaster-stricken resident. According to the present aspect, it is possible to realize at least one of the improvement of the convincing feeling for the damage determination result, the reduction of the investigation cost by the local government, or the decrease of fluctuation of the damage determination results by a plurality of investigators.

In the damage determination information system according to another aspect of the present disclosure, the provisional damage determination result may be input from the input device of the terminal apparatus.

In the damage determination information system according to still another aspect of the present disclosure, at least one of the first processor or the second processor may acquire the provisional damage determination result by image recognition from an image showing a target building of a damage determination.

In the damage determination information system according to still another aspect of the present disclosure, at least one of the first processor or the second processor may perform damage determination result estimation processing of using, as input, an image showing a target building of a damage determination and building information related to a structure and a portion of the target building to output a damage classification of the portion, and an estimation result of the damage determination result estimation processing may be used as the provisional damage determination result.

In the damage determination information system according to still another aspect of the present disclosure, at least one of the first processor or the second processor may include a trained model that has been subjected to machine learning processing to output the damage classification estimated for the portion of the target building in a case in which the image showing the target building and the building information related to the structure and the portion of the target building are input.

In the damage determination information system according to still another aspect of the present disclosure, a damage category in a damage determination criterion may be defined in a plurality of stages according to a degree of damage, and the plurality of disaster images related to the provisional damage determination result may include the disaster image belonging to a damage category of a degree of damage equal to or higher than an input provisional damage determination result.

In the damage determination information system according to still another aspect of the present disclosure, the plurality of disaster images related to the provisional damage determination result may include the disaster image belonging to a damage category of the same degree of damage as the input provisional damage determination result and the disaster image belonging to a damage category of which the degree of damage is higher than the provisional damage determination result by one stage.

Still another aspect of the present disclosure relates to a server device comprising a disaster image database that stores a damage determination result of a disaster-stricken building and a disaster image which corresponds to the damage determination result and in which the disaster-stricken building is imaged, in association with each other, and a first processor, in which the first processor acquires a provisional damage determination result, extracts a plurality of the disaster images related to the provisional damage determination result from the disaster image database based on the acquired provisional damage determination result, provides the extracted plurality of disaster images to a terminal apparatus connected via a network, and registers a settled damage determination result in a damage investigation result database based on an instruction from the terminal apparatus that displays the plurality of disaster images.

Still another aspect of the present disclosure relates to a terminal apparatus that is connected to the server device according to the aspect described above via the network, the terminal apparatus comprising a second processor, a display device, and an input device, in which the second processor displays the extracted plurality of disaster images on the display device, and receives input of an instruction for settling the damage determination result from the input device.

Still another aspect of the present disclosure relates to a program causing a computer to realize a function of managing a disaster image database that stores a damage determination result of a disaster-stricken building and a disaster image which corresponds to the damage determination result and in which the disaster-stricken building is imaged, in association with each other, a function of acquiring a provisional damage determination result, a function of extracting a plurality of the disaster images related to the provisional damage determination result from the disaster image database based on the acquired provisional damage determination result, a function of providing the extracted plurality of disaster images to a terminal apparatus connected via a network, and a function of registering a settled damage determination result in a damage investigation result database based on an instruction from the terminal apparatus after the disaster image is displayed on a display device of the terminal apparatus.

The program according to the present aspect is applied to a server side.

Still another aspect of the present disclosure relates to a program causing a computer to function as a terminal apparatus connected to a server device that manages a damage determination result of a disaster-stricken building and a disaster image which corresponds to the damage determination result and in which the disaster-stricken building is imaged, via a network, the program causing the computer to realize a function of acquiring a provisional damage determination result, a function of transmitting the acquired provisional damage determination result to the server device, a function of acquiring a plurality of the disaster images related to the provisional damage determination result from the server device to display the plurality of disaster images on a display device, and a function of receiving input of an instruction for settling the damage determination result after the disaster image is displayed.

According to the present invention, it is possible to realize at least one of the improvement of the convincing feeling for the damage determination result, the reduction of the investigation cost by the local government, or the decrease of fluctuation of the damage determination results by a plurality of investigators.

BRIEF DESCRIPTION OF THE DRAWINGS

FIG. 1 is a functional block diagram schematically showing a function of a damage determination information system according to an embodiment of the present invention.

DESCRIPTION OF THE PREFERRED EMBODIMENTS

Figure 2:
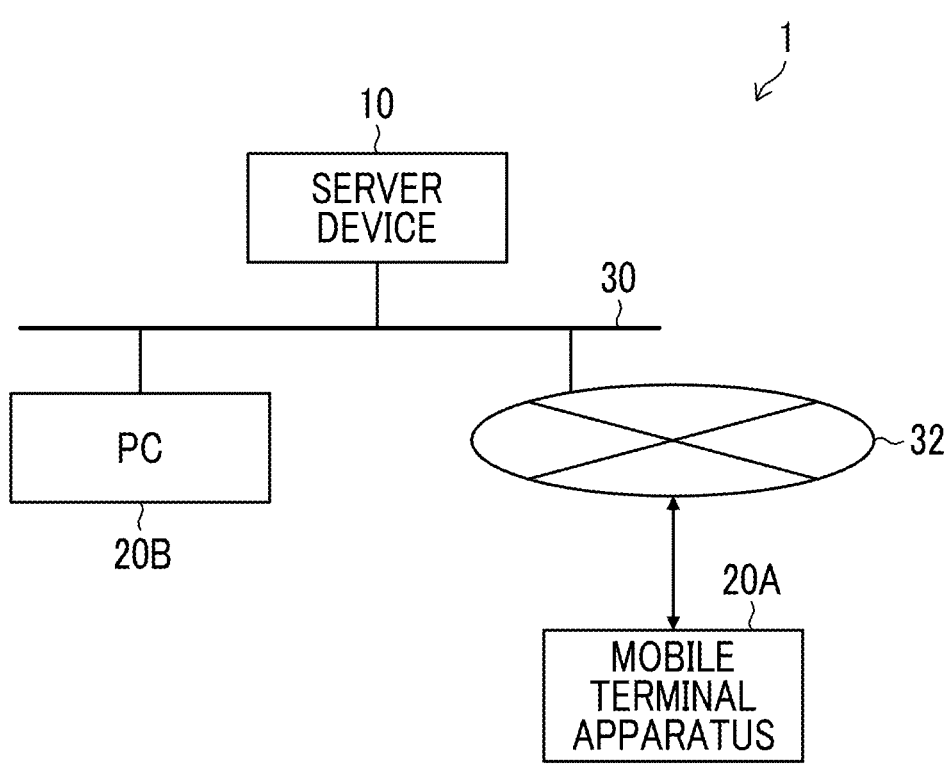
FIG. 2 is a block diagram showing an example of a network configuration of the damage determination information system.

Hereinafter, a preferred embodiment of the present invention will be described in detail with reference to the accompanying drawings.

Overview of Damage Determination Information System

Figure 1:
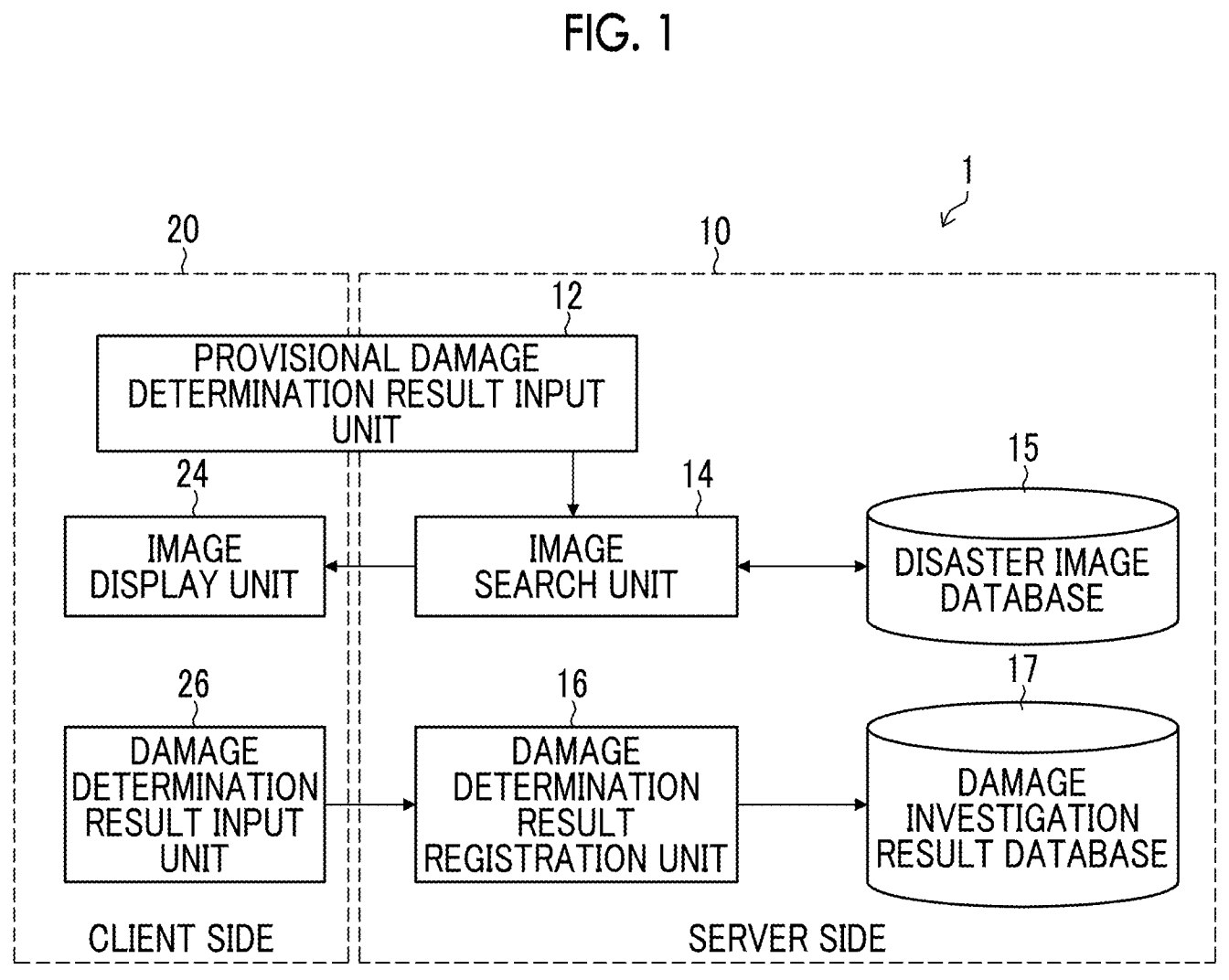

FIG. 1 is a functional block diagram schematically showing a function of a damage determination information system 1 according to the embodiment of the present invention. The damage determination information system 1 includes a server device 10 that performs server side processing and a terminal apparatus 20 that performs client side processing. The terminal apparatus 20 is connected to the server device 10 via a network (not shown).

The server device 10 manages a damage determination result for the disaster-stricken building and a disaster image corresponding to the damage determination result. Here, the damage determination result is, for example, a determination result of a degree of damage by a residence damage certification investigation, and the disaster-stricken building is a house (residence) which is a target of a damage determination.

In a case of the residence damage certification investigation due to an earthquake or the like, the determination result, which is classified into any category of five-stage categories of "complete destruction", "large-scale half destruction", "half destruction", "semi-half destruction" and "non-semi-half destruction (partially damaged)" depending on the degree of damage of the residence, is given. In addition to the earthquake, a target of the disaster may be flood damage, wind damage, and the like. According to the certification criterion for the degree of damage described in "damage certification criterion operation guidelines for residence related to disaster" (March 2020) shown by the Cabinet Office, the "complete destruction" is defined that "The residence has lost the basic functions for residing, that is, the entire residence is collapsed, washed away, buried, or burned, the residence is severely damaged and it is difficult to reuse the residence by repairing the residence, specifically, the residence has a floor area of a damaged, burned, or washed-out portion of the residence reaching 70% or more of a total floor area of the residence, or a damage ratio of the residence reaches 50% or more in a case in which the economic damage of the main components of the residence is expressed by the damage ratio with respect to the entire residence".

The "large-scale half destruction" is defined that "The residing residence has half destructed and it is difficult to reside in the residence without a large-scale repair including the repair of a major portion in terms of structural strength, specifically, the damaged portion is 50% or more and less than 70 of the total floor area of the residence, or the damage ratio of the residence is 40% or more and less than 50% in a case in which the economic damage of the main components of the residence is expressed by the damage ratio with respect to the entire residence".

The "half destruction" is defined that "The residence has lost a part of the basic functions for residing, the residence is severely damaged, but it is possible to reuse the residence by repairing the residence, specifically, the damaged portion is 20 or more and less than 70% of the total floor area of the residence, or the damage ratio of the residence is 20% or more and less than 50% in a case in which the economic damage of the main components of the residence is expressed by the damage ratio with respect to the entire residence".

The "semi-half destruction" is defined that "The residence is damaged to the extent that the residence is half destructed or half burned, specifically, the damaged portion is 10% or more and less than 20% of the total floor area of the residence, or the damage ratio of the residence is 10% or more and less than 20% in a case in which the economic damage of the main components of the residence is expressed by the damage ratio with respect to the entire residence".

For example, in a case of the disaster caused by the earthquake, the determination of the degree of damage to the disaster-stricken residence includes a determination based on an appearance, a determination based on an inclination, and a determination based on a portion. In the determination based on the appearance, it is defined that "It is determined from the appearance of the residence, and in a case in which the entire residence is collapsed at first glance, in a case in which a part of floors of the residence is entirely collapsed at first glance, in a case in which the entire residence has leaked or been slipped down at first glance, in a case in which there is significant damage to the foundation to the ground damage due to the earthquake, and the like, the damage ratio of the residence is set to 50% or more and it is determined that the residence is completely destructed".

In the determination based on the inclination, for example, in a case of a wooden residence, "In a case in which the inclination of the residence is $\frac{1}{20}$ or more, the damage ratio of the residence is set to 50% or more, and it is determined that the residence is completely destructed". Moreover, it is defined that "In a case in which the inclination of the residence is $\frac{1}{60}$ or more and less than $\frac{1}{20}$, in a case in which the damage ratio of the residence is calculated from the "determination based on the portion", the damage ratio due to the inclination can be set to 15%". It should be noted that, as for a value of the inclination, as a general rule, a value obtained by measuring pillars at the four corners of the first floor of the residence or the four corners of the wall and performing simple averaging.

In the determination based on the portion, it is defined that "A damage rate is calculated for each portion from a result of visual investigation related to the damage to the main components of the residence, and the sum of portion damage ratios obtained by multiplying the damage rate by a portion composition ratio is used as the damage ratio of the residence", and it is defined that "It is determined that a case in which the damage ratio of the residence is 50% or more is the complete destruction, a case in which the damage ratio of the residence is 40% or more and less than 50% is the large-scale half destruction, a case in which the damage ratio of the residence is 20% or more and less than 40% is the half destruction, a case in which the damage ratio of the residence is 10% or more and less than 20% is semi-half destruction, and a case in which the damage ratio of the residence is less than 10% is non-semi-half destruction (partially damaged)".

According to the criterion described above, the degree of damage to the target disaster-stricken building is evaluated, and the damage determination result is given. The five-stage damage categories of the "complete destruction", the "large-scale half destruction", the "half destruction", the "semi-half destruction", or the "non-semi-half destruction (partially damaged)" are examples of a "damage category in a damage determination criterion" according to the present disclosure, and the five stages are examples of a "plurality of stages" according to the present disclosure.

The terminal apparatus 20 includes a user interface (UI) capable of inputting the damage determination result and displaying the image, such as the disaster image. The server device 10 may be a world wide web server (Web server), or the terminal apparatus 20 may include a Web browser.

For example, the terminal apparatus 20 may be a mobile terminal apparatus taken out to a disaster site or the like by an investigator or the like, or may be a computer installed at a window of a local government that receives an application for a disaster certificate. Moreover, the terminal apparatus 20 may be a smartphone, a tablet, a personal computer, or the like owned by a resident or the like. A user of the present system, including an operator of the terminal apparatus 20, is referred to as a "user".

The damage determination information system 1 includes a provisional damage determination result input unit 12, an image search unit 14, a disaster image database 15, an image display unit 24, a damage determination result input unit 26, a damage determination result registration unit 16, and a damage investigation result database 17. Each of these units is realized by executing a command of the program by one or more processors, such as a computer.

The provisional damage determination result input unit 12 receives the input of a provisional damage determination result, and performs processing of transferring the input information of the provisional damage determination result to the image search unit 14. The provisional damage determination result input unit 12 is constructed to straddle both the client side and the server side. The user can input the provisional damage determination result through the provisional damage determination result input unit 12.

The server side further includes the image search unit 14, the disaster image database 15, the damage determination result registration unit 16, and the damage investigation result database 17. On the other hand, the client side includes the image display unit 24 and the damage determination result input unit 26.

The damage determination information system 1 receives the input of the provisional damage determination result through the provisional damage determination result input unit 12, searches for the disaster image related to the input provisional damage determination result from the disaster image database 15, and displays the disaster image extracted as a result of the search on the terminal apparatus 20.

The user can determine the validity of the provisional damage determination result previously input with reference to the disaster image displayed on the terminal apparatus 20. After confirming the disaster image displayed on the terminal apparatus 20, the user can perform the input of the instruction for settling the damage determination result to be registered, by performing approval of the provisional damage determination result on the terminal apparatus 20 or performing an input operation of changing the damage determination result as needed. Based on the settling instruction input from the terminal apparatus 20 in this way, the server device 10 registers the damage determination result in the damage investigation result database 17.

Here, "provisional" is a decision or a tentative assumption at a stage before the settling instruction, and need only be changeable. Moreover, "settling" means that a determination is made regarding the registration in the damage investigation result database 17 in which the result of the damage investigation is registered, and thereafter, registered items in the damage investigation result database 17 may be changed by a detailed administrative investigation or the like.

The image search unit 14 performs image search processing of extracting one or more disaster images related to the provisional damage determination result, preferably, a plurality of disaster images from the disaster image database 15, based on the provisional damage determination result input via the provisional damage determination result input unit 12. For example, the disaster image related to the provisional damage determination result includes at least one of the disaster image of the determination result of the same degree of damage as the provisional damage determination result, the disaster image of the determination result of which the category of the degree of damage is higher than the provisional damage determination result by one stage, or the disaster image of the determination result of which the category of the degree of damage is lower than the provisional damage determination result by one stage, preferably two or more thereof. The disaster image corresponding to the category that is the same as or at least one category before or after the degree of damage of the provisional damage determination result may be expressed as "disaster image having the similar damage determination result". The determination result of the category indicating the degree of damage that is the same as or close to the provisional damage determination result may be expressed as "determination result similar" to the provisional damage determination result.

The disaster image database 15 includes a data group that stores the settled damage determination result for the disaster-stricken building in the past disaster and the disaster image which corresponds to the damage determination result and in which the disaster-stricken building is imaged, in association with each other. The disaster image database 15 includes a plurality of images of the disaster-stricken building corresponding to the respective damage determination results. The disaster image database 15 may include data in which an image of the disaster-stricken residence of the disaster, which is the target of the present time, and the settled damage determination result for the disaster-stricken residence are associated with each other. Moreover, the disaster image database 15 may include data in which the disaster image associated with information related to the structure of the disaster-stricken building and/or the information of the portion and a value of the portion damage ratio thereof are associated with each other.

The image search unit 14 provides search result information including the plurality of disaster images related to the provisional damage determination result extracted from the disaster image database 15 to the terminal apparatus 20 via a network.

The image display unit 24 displays the plurality of disaster images extracted by the image search unit 14 on a display device, such as a liquid crystal display or an organic EL display, together with the corresponding damage determination results. The user can confirm, on the display device of the terminal apparatus 20, the disaster image showing the disaster-stricken building for which the determination result of the degree of damage equal to and/or close to the provisional damage determination result is settled.

The damage determination result input unit 26 is an input processing module that receives the input of the instruction for settling the damage determination result. As the instruction for settling the damage determination result, information to the effect that the provisional damage determination result is approved may be input, or the damage determination result to be settled may be directly input as the registration content. For example, a specific input operation method may be a method of checking a check box, may be a method of selecting a specific damage determination result from a candidate list, or may be a method of inputting text information of the damage determination result using a keyboard or the like.

Based on the information from the damage determination result input unit 26, the damage determination result registration unit 16 performs processing of registering an address of the disaster-stricken building, other information, and the damage determination result for the disaster-stricken building in association with each other in the damage investigation result database 17. A part or all of the data registered in the damage investigation result database 17 may be incorporated into the disaster image database 15.

FIG. 2 is a block diagram showing an example of a network configuration of the damage determination information system 1. The server device 10 is constructed on a network 30 inside or outside an administrative agency, such as the local government. The network 30 may be a local area network, or may be a wide area network. The server device 10 may be a cloud server or may be an on-premise server.

The damage determination information system 1 may include a mobile terminal apparatus 20A that can communicate with the server device 10 and a personal computer (PC) 20B. Each of the mobile terminal apparatus 20A and the PC 20B corresponds to the terminal apparatus 20 described with reference to FIG. 1. FIG. 2 shows one mobile terminal apparatus 20A and one PC 20B, but the damage determination information system 1 may include a plurality of mobile terminal apparatuses 20A and a plurality of PCs 20B.

The mobile terminal apparatus 20A is connected to the server device 10 via a wide area communication line 32, such as the Internet. The mobile terminal apparatus 20A may be a smartphone, a tablet terminal, or the like. The PC 20B may be, for example, a computer installed on the network 30 of the administrative agency, such as the local government. The network 30 and the wide area communication line 32 are examples of a "network" according to the present disclosure.

Use Example 1

A use example 1 of the damage determination information system 1 according to the present embodiment will be described. Here, an aspect of use for a damage certification investigation by the investigator (for example, a local government employee) will be described. The investigator uses the present system in a case in which the certainty of the determination result of the degree of damage is low in the damage certification investigation.

The investigator inputs the structure of the target building, the portion of the building under the investigation, and the provisional damage determination result to the mobile terminal apparatus 20A. In a case in which the investigator cannot make the provisional damage determination result from his/her determination, the investigator may perform processing of using the image of the disaster-stricken building as the input to estimate the damage determination result from the image using the image recognition technology to use the estimated damage determination result as the provisional damage determination result. For example, the image showing the disaster-stricken target building and information related to the structure and the portion of the target building can be used as input, and the provisional damage determination result can be obtained by using artificial intelligence (AI) that estimates the damage determination result from these pieces of input information. The term "estimation" may be rephrased as "prediction". The AI that estimates the damage determination result may be provided in the server device 10. For example, the provisional damage determination result input unit 12 on the server side may include an AI processing module that estimates the damage determination result by receiving input of the image of the disaster-stricken building and incidental information including the structure and/or the portion of the building.

The AI that estimates the damage determination result includes a trained model that has been trained to output a damage classification of each portion as output in a case in which the disaster image showing the target building for which the damage determination result is to be estimated and the information related to the structure and the damage estimation portion of the target building are input.

The information of the "structure of the building" is, for example, information of a wooden structure or a non-wooden structure. The information related to the damage estimation portion is, for example, information related to a roof, a foundation, or a wall. The damage classification of each portion is represented by, for example, in a case of the roof, five stages from the degree of damage I to V.

The damage classification at each portion may be performed according to "damage certification criterion operation guidelines for residence related to disaster" (March 2020) shown by the Cabinet Office. As the output value from the AI that estimates the damage determination result, a probability value (score) classified into each classification may be output, or a classification level may be expressed as a continuous value.

It should be noted that, as a learning method of an AI model, a learning method similar to a general machine learning method, such as deep learning, may be applied.

The image search unit 14 extracts a plurality of images of the disaster-stricken building related to past determination cases corresponding to the determination results before and after the provisional damage determination result from the disaster image database 15 based on the structure, the portion, and the provisional damage determination result of the building which are input, and displays the extracted images on the mobile terminal apparatus 20A.

The determination results before and after the provisional damage determination result mean the categories before and after the category of the damage determination according to the degree of damage, and for example, in a case in which the provisional damage determination result is the "half destruction", the "semi-half destruction" is a category before the "half destruction" by one stage (lower than the "half destruction" by one stage), and the "large-scale half destruction" is a category behind the "half destruction" by one stage (higher than the "half destruction" by one stage).

The image search unit 14 in the present embodiment extracts the plurality of disaster images corresponding to the determination result same as the provisional damage determination result and the determination results of the degree of damage before and after the provisional determination result, but the disaster image corresponding to at least one determination result of the determination results before and after the provisional damage determination result need only be extracted. An image in a category range of what degree of damage, which is extracted as the image related to the provisional damage determination result may be preset or may be able to be appropriately selected by the user operation.

From the viewpoint of providing an image to be used as a reference for the investigator, it is preferable that the image search unit 14 extract the plurality of disaster images corresponding to the determination results of each of the provisional damage determination result and the determination results of the degree of damage before and after the provisional determination result.

As a result, the investigator can confirm the disaster image corresponding to the damage determination result of the category adjacent to the input provisional damage determination result on the screen of the mobile terminal apparatus 20A. The investigator can select the determination result including the image of the same degree of damage as the degree of damage of the investigation target building from a pair of the determination result and the disaster image group of the disaster-stricken building displayed on the mobile terminal apparatus 20A, and can decide the determination result of the target building.

With the damage determination information system 1 according to the present embodiment, the investigator can settle the degree of damage to the target building with the convincing feeling by using the image group registered by the investigator by himself/herself based on the determination result in the past as a reference.

It is not necessary to go through a process of making inquiries to the coordinator or obtaining the agreement with the investigation team as in the related art, so that the investigation time is shortened. Moreover, by using the present system using the past image as a reference, it is possible to decrease the fluctuation of the determination results between the investigators.

Use Example 2

Next, a use example 2 of the damage determination information system 1 according to the present embodiment will be described. Here, an aspect of use for the damage certification investigation result for issuing the disaster certificate to the resident will be described. In a case in which the local government receives an application for issuance of the disaster certificate and explains the result of the investigation conducted by the local government (result of the primary investigation) to the resident, the present system is used for the resident who is not convinced of the investigation result.

In this case, the employee inputs, from the mobile terminal apparatus 20A or the PC 20B, the damage determination result of the primary investigation of the residing building of the resident as the "provisional damage determination result". In a case in which a new image of the residing building is provided from the resident, the image is used as input, and the damage determination result (provisional damage determination result) can be obtained by using the AI that estimates the damage determination result according to the information related to the structure of the building or the like. In particular, in a case in which there is a determination portion or the like that the resident is not convinced of, that portion is also designated.

The server device 10 extracts the plurality of images of the disaster-stricken building belonging to the damage category of the degree of damage equal to or higher than the degree of damage of the provisional damage determination result from the disaster image database 15 based on the incidental information, such as the information related to the structure of the residing building (residence) of the resident and the provisional damage determination result, and displays the extracted images on the mobile terminal apparatus 20A or the PC 20B.

The resident determines whether or not the damage classification of his/her residence is appropriate for the current damage determination result by confirming the displayed pair of the determination result and the disaster image group. In a case in which the resident determines that the damage classification is appropriate, the resident displays the intention by pressing a graphical user interface (GUI) button indicating that the resident is convinced of the damage determination result, and then transmits the notification or the like certifying that the resident is convinced of the present determination result to the local government. In a case in which the notification is received, the local government will be able to issue the disaster certificate to the resident.

It is considered that the resident can obtain a more convincing feeling by seeing the image of the house in which the equal determination in the past is made as to whether or not the determination result of the resident is valid by this system. It is considered that, with the present system, the improvement of explanation to the resident, the convincing feeling, and the reduction of unnecessary secondary investigation are achieved.

Figure 3:
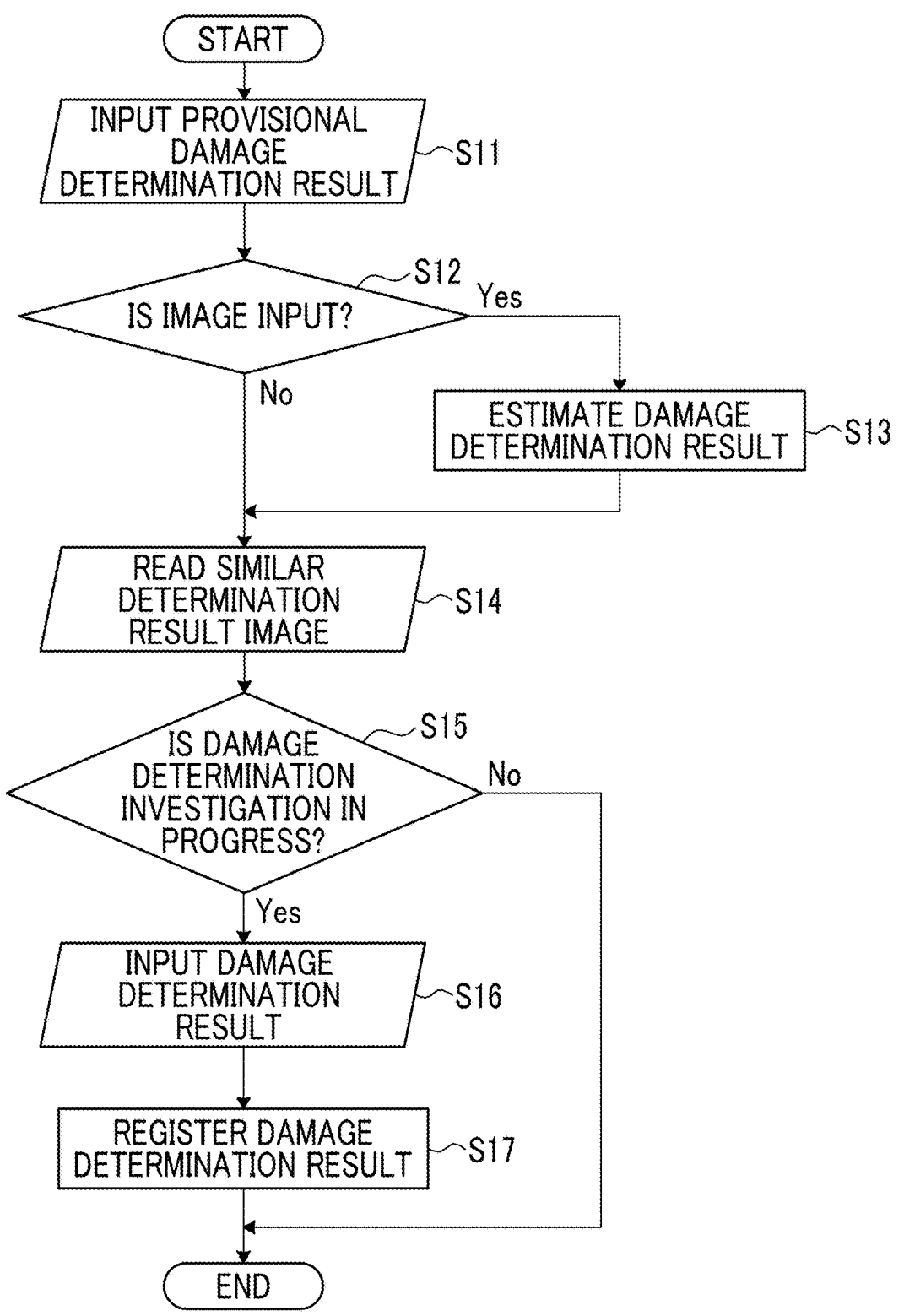
FIG. 3 is a flowchart showing an operation example of the damage determination information system.

FIG. 3 is a flowchart showing an operation example of the damage determination information system 1. Each step shown in FIG. 3 is executed by a first processor that executes processing of the server device 10 or a second processor that executes processing of the terminal apparatus 20. Each of the first processor and the second processor may include a plurality of processors.

In step S11, the second processor receives the input of the provisional damage determination result. The second processor can receive the input of the information related to the damage category indicating the provisional damage determination result, or can receive the input of the image showing the target building of the damage determination. It should be noted that, in a case in which the image is input, the building information related to the structure and the portion of the target building may be input in addition to the image.

The data input through the terminal apparatus 20 is transmitted to the server device 10 via the network. The first processor receives the input of data, such as a provisional damage determination result, through the terminal apparatus 20 and the network.

Then, in step S12, the first processor determines whether or not the input data includes the image. In a case in which the determination result in step S12 is a Yes determination, the first processor proceeds to step S13.

In step S13, the first processor estimates the damage determination result from the input image by the image recognition of the AI, and acquires the damage classification according to the degree of damage of the target building. The estimation result obtained by this damage determination result estimation processing is used as the provisional damage determination result. After step S13 or in a case in which the determination result in step S12 is a No determination, the first processor proceeds to step S14.

In step S14, the first processor extracts the disaster image having the determination result similar to the provisional damage determination result from the disaster image database 15 by using the provisional damage determination result as a search key, and provides the extracted disaster image to the terminal apparatus 20. The second processor on the terminal apparatus 20 side reads the disaster image having the determination result similar to the provisional damage determination result extracted from the disaster image database 15, and displays the read disaster image on the display device of the terminal apparatus 20.

Then, in step S15, the second processor determines whether or not the damage determination investigation is in progress. For example, in a case in which the determination result in step S15 is a Yes determination, such as in a case in which the investigator or the like uses the present system during the investigation work as in "use example 1" described above, the second processor proceeds to step S16 and receives the input of the damage determination result to be registered. After displaying the disaster image extracted from the disaster image database 15 on the display device of the terminal apparatus 20, in a case in which the user inputs the damage determination result via the damage determination result input unit 26 of the terminal apparatus 20, and the input information is transmitted to the server device 10.

Then, in step S17, the first processor performs processing of registering the damage determination result input via the damage determination result input unit 26 in the damage investigation result database 17.

After step S17, the flowchart of FIG. 3 is terminated. Moreover, in a case in which the determination result in step S15 is a No determination, the flowchart of FIG. 3 may be terminated by skipping steps S16 to S17.

Configuration Example of Server Device 10

Figure 4:
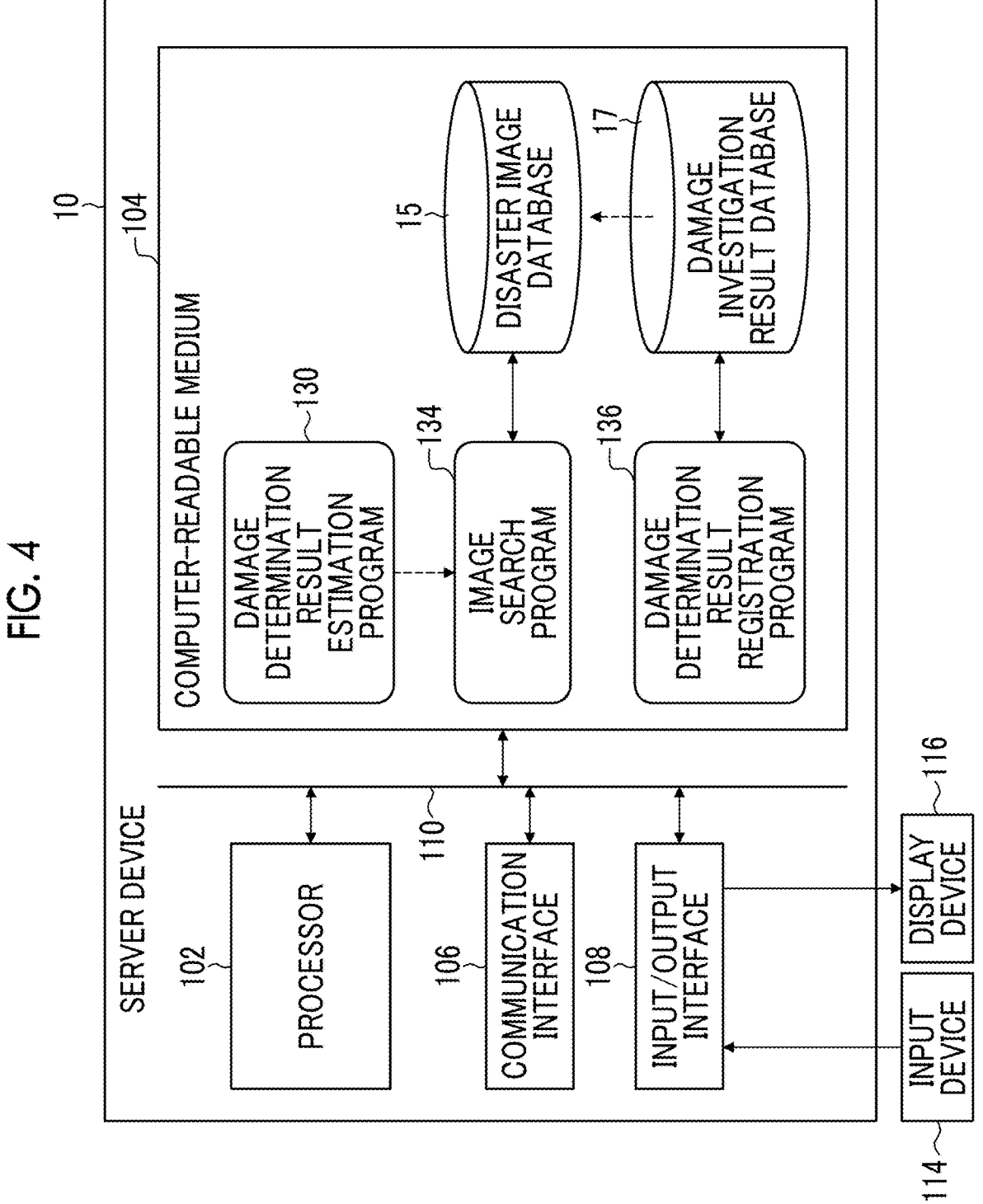
FIG. 4 is a block diagram showing a configuration example of a server device.

FIG. 4 is a block diagram showing a configuration example of the server device 10. The server device 10 can be realized by a computer system configured by using one or more computers. Various functions of the server device 10 are realized by installing the program on the computer.

The server device 10 comprises a processor 102, a computer-readable medium 104 that is a non-transitory tangible object, a communication interface 106, an input/output interface 108, a bus 110, an input device 114, and a display device 116. The processor 102 is an example of the first processor. The computer-readable medium 104 may be rephrased as a first storage device.

The processor 102 includes a central processing unit (CPU). The processor 102 may include a graphics processing unit (GPU). The processor 102 is connected to the computer-readable medium 104, the communication interface 106, and the input/output interface 108 via the bus 110. The input device 114 and the display device 116 are connected to the bus 110 via the input/output interface 108.

The computer-readable medium 104 includes a memory that is a main storage device, and a storage that is an auxiliary storage device. The computer-readable medium 104 may be, for example, a semiconductor memory, a hard disk drive (HDD) device, a solid state drive (SSD) device, or a combination of a plurality of semiconductor memories, HDD devices, and SSD devices.

The communication interface 106 controls wired and/or wireless communication. The server device 10 is connected to the network 30 (see FIG. 4) via the communication interface 106.

A plurality of programs, data, and the like for performing various pieces of processing are stored in the computer-readable medium 104. The computer-readable medium 104 stores, for example, a damage determination result estimation program 130, an image search program 134, a damage determination result registration program 136, the disaster image database 15, and the damage investigation result database 17.

The damage determination result estimation program 130 may include one or more trained AI models (trained models) that have been trained to obtain output of a target task by applying machine learning, such as deep learning. The AI model can be configured by using, for example, a convolutional neural network (CNN) having a convolutional layer.

One of the AI models included in the damage determination result estimation program 130 may be a trained model that has been subjected to the machine learning processing to output the damage classification estimated for the portion of the target building in a case in which the image showing the target building and the building information related to the structure and the portion of the target building are input. The damage determination result estimation program 130 inputs the disaster image showing the disaster-stricken building, the structure of the target building, and the information related to the damage estimation portion to the AI model, and acquires a prediction value (estimation value) of the damage determination result of the target building as the output. Such an AI model has been trained in advance by machine learning using a data set of training data in which the damage determination result settled in the actual damage certification investigation is associated as a correct answer label with input data including the disaster image showing the disaster-stricken building, the structure of the target building, and the information related to the damage target portion. The estimation processing executed according to the damage determination result estimation program 130 is an example of "damage determination result estimation processing" according to the present disclosure. It should be noted that, it is also possible to create the training data from the data registered in the damage investigation result database 17.

The damage determination result estimated by the damage determination result estimation program 130 is transferred to the image search program 134 as the "provisional damage determination result".

The image search program 134 extracts the image having the determination result similar to the provisional damage determination result from the disaster image database 15 based on the provisional damage determination result. The image extracted by the image search program 134 is transmitted to the terminal apparatus 20 via the communication interface 106.

The damage determination result registration program 136 registers the information in the damage investigation result database 17 and manages the database. The damage determination result registration program 136 performs processing of registering the damage determination result input from the terminal apparatus 20 displaying the image having the determination result similar to the provisional damage determination result in the damage investigation result database 17. In this way, the "settled damage determination result" is registered in the damage investigation result database 17. It should be noted that, it is possible that the registered (settled) damage determination result may be changed by the subsequent secondary investigation or the like.

The processor 102 executes a command of the damage determination result estimation program 130, so that the processor 102 functions as a processing unit that estimates the damage determination result by image recognition. Moreover, the processor 102 executes the commands of the image search program 134 and the damage determination result registration program 136, so that the processor 102 functions as the image search unit 14 and the damage determination result registration unit 16.

Moreover, a display control program (not shown) is stored in the computer-readable medium 104. The display control program generates a display signal necessary for display output to the display device 116 and performs display control of the display device 116.

For example, the display device 116 is composed of a liquid crystal display, an organic electro-luminescence (OEL) display, a projector, or an appropriate combination thereof. For example, the input device 114 is composed of a keyboard, a mouse, a touch panel, a multi-touch screen, or other pointing devices, a voice input device, or an appropriate combination thereof. The input device 114 receives various inputs by the operator.

It should be noted that FIG. 4 shows an example in which the damage determination result estimation program 130, the image search program 134, the damage determination result registration program 136, the disaster image database 15, and the damage investigation result database 17 are constructed on one server device 10, but the processing functions and the databases of these programs may be realized by distributing the functions to a plurality of computers.

Configuration Example of Terminal Apparatus 20

Figure 5:
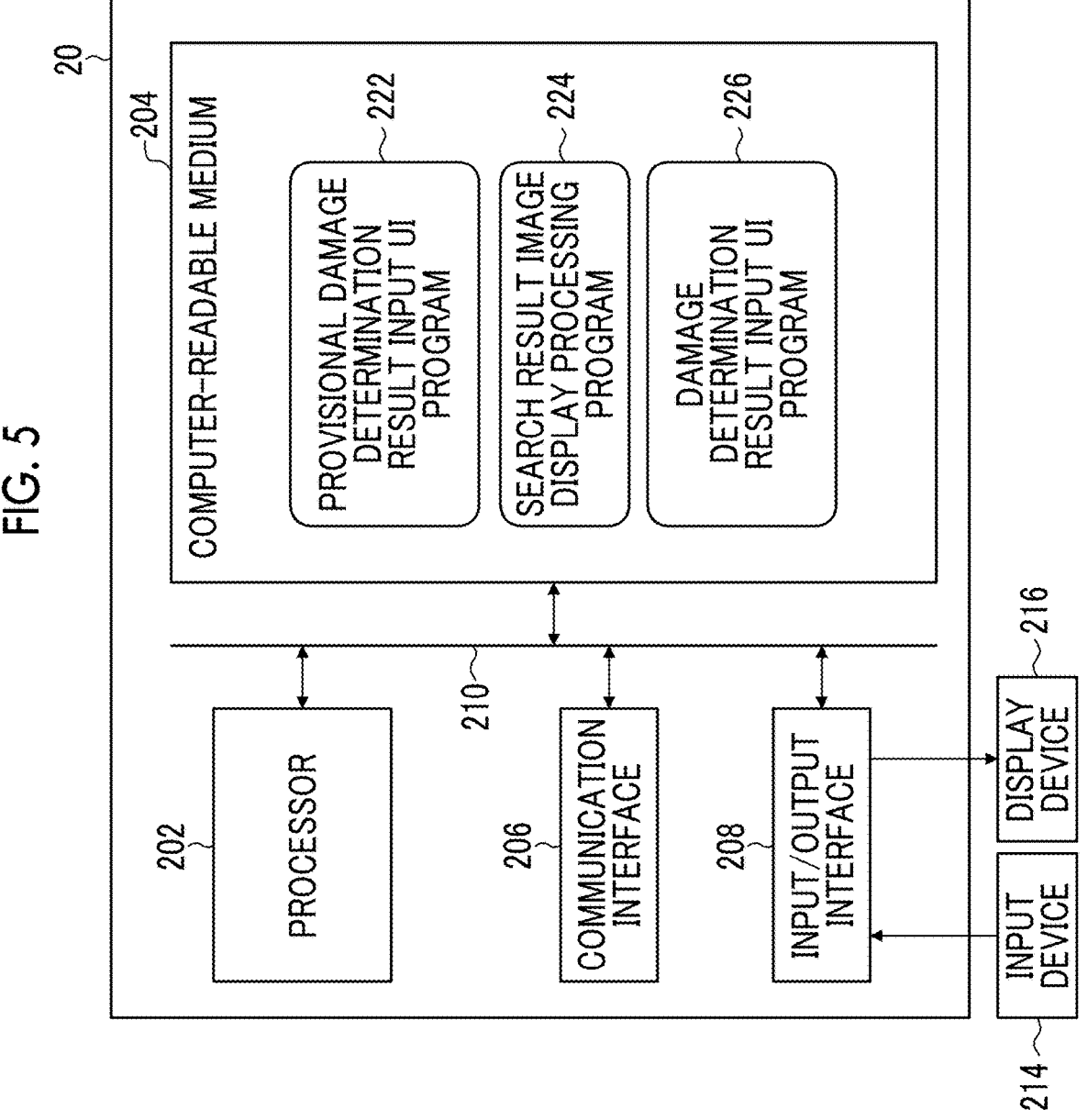
FIG. 5 is a block diagram showing a configuration example of a terminal apparatus.

FIG. 5 is a block diagram showing a configuration example of the terminal apparatus 20. The terminal apparatus 20 comprises a processor 202, a computer-readable medium 204 that is a non-transitory tangible object, a communication interface 206, an input/output interface 208, a bus 210, an input device 214, and a display device 216. The hardware configuration of the terminal apparatus 20 may be the same as the hardware configuration of the server device 10 described with reference to FIG. 4.

The hardware configurations of the processor 202, the computer-readable medium 204, the communication interface 206, the input/output interface 208, the bus 210, the input device 214, and the display device 216 shown in FIG. 5 may be the same as the corresponding elements shown in FIG. 4. The processor 202 is an example of the second processor. The computer-readable medium 204 may be rephrased as a second storage device.

The terminal apparatus 20 is communicably connected to the server device 10 via the communication interface 206.

The computer-readable medium 204 stores various programs and data including a provisional damage determination result input user interface (UI) program 222, a search result image display processing program 224, and a damage determination result input UI program 226. The provisional damage determination result input UI program 222 performs processing of displaying an input screen for receiving input of the provisional damage determination result and processing of the input information. The search result image display processing program 224 performs processing of displaying the plurality of disaster images provided by the server device 10 on the display device 216. The damage determination result input UI program 226 receives the input of the damage determination result to be registered and processes the input information.

The processor 202 executes a command of the provisional damage determination result input user interface (UI) program 222, so that the processor 202 and the input device 214 function as the provisional damage determination result input unit 12. Moreover, the processor 202 executes a command of the search result image display processing program 224, so that the processor 202 and the display device 216 function as the image display unit 24. Further, the processor 202 executes a command of the damage determination result input UI program 226, so that the processor 202 and the input device 214 function as the damage determination result input unit 26.

Moreover, a display control program (not shown) is stored in the computer-readable medium 204. The display control program generates a display signal necessary for display output to the display device 216 and performs display control of the display device 216.

Furthermore, the terminal apparatus 20 may include a camera and/or a media interface (not shown). The damage determination result may be estimated by the damage determination result estimation program 130 by imaging the target building with the camera mounted on the terminal apparatus 20 and transmitting the captured image to the server device 10. Moreover, in a case in which the disaster image of the target building is stored in portable external storage media, such as a memory card, the damage determination result may be estimated in the damage determination result estimation program 130 by reading the disaster image from the portable external storage media via the media interface and transmitting the read image to the server device 10.

It should be noted that, in the present embodiment, the damage determination result estimation program 130 is incorporated in the server device 10, but the damage determination result estimation program 130 may be incorporated in the terminal apparatus 20. In this case, the processor 202 of the terminal apparatus 20 can function as the processing unit that estimates the damage determination result.

Example 1 of Display Screen in Terminal Apparatus 20

Figure 6:
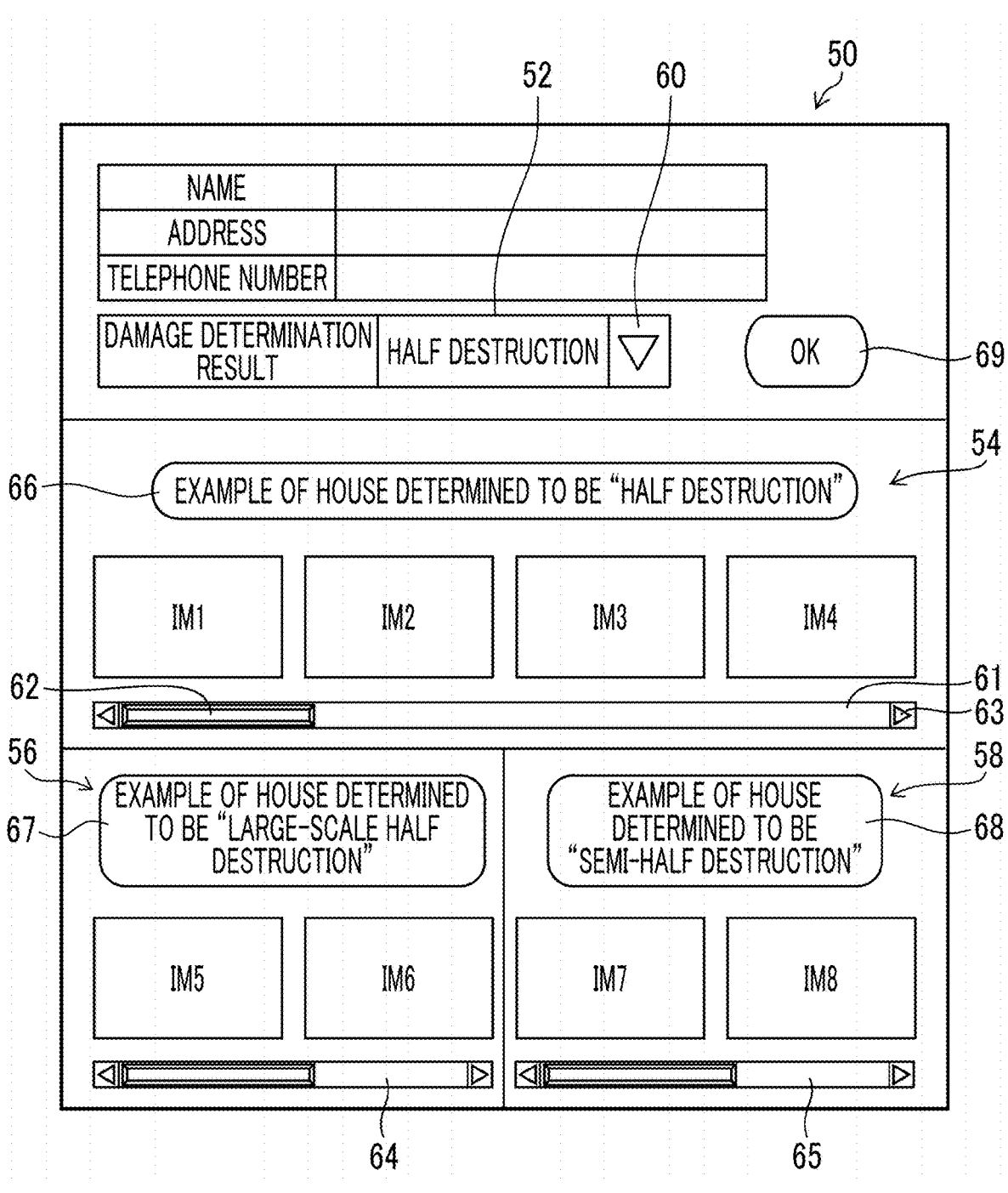
FIG. 6 is an example of a screen displayed on a display device of the terminal apparatus.

FIG. 6 is an example of a screen displayed on the display device 216 of the terminal apparatus 20. A display screen 50 includes a field for entering the name, the address, and the telephone number of the resident (applicant for the investigation) of the target building, a damage determination result input box 52, a first image display area 54, a second image display area 56, and a third image display area 58.

The damage determination result input box 52 is a field for inputting the provisional damage determination result. In a case in which a pull-down button 60 displayed next to the damage determination result input box 52 is pressed, a pull-down menu (pull-down list) including five categories of the "complete destruction", the "large-scale half destruction", the "half destruction", the "semi-half destruction", and the "non-semi-half destruction" as input candidates are displayed, and the user can select a desired determination result from the pull-down menu to perform the input to the damage determination result input box 52. Here, an example is shown in which the "half destruction" is designated as the provisional damage determination result. It should be noted that the "pressing" of the GUI button includes the concept of an operation, such as "clicking" or "tapping". It should be noted that, although not shown in FIG. 6, in addition to the damage determination result input box 52, an input box for inputting the information related to the structure and/or the portion of the building may be further provided.

The first image display area 54 is an area for displaying the disaster image corresponding to the provisional damage determination result. Each of images IM1, IM2, IM3, and IM4 in FIG. 6 represents an example of an image determined to be "half destruction" in the past disaster. Here, four images IM1 to IM4 are displayed side by side in the horizontal direction, but the number of images to be displayed and the arrangement form of the images are not limited to the shown example. The same applies to the other image display areas. The image in the first image display area 54 can be scrolled by dragging a knob 62 of a scroll bar 61 displayed in a lower part of the first image display area 54 or clicking an arrow 63.

The second image display area 56 is an area for displaying the disaster image corresponding to the determination result in which the damage category is higher than the provisional damage determination result by one stage. Each of the images IM5 and IM6 in FIG. 6 represents an example of an image determined to be "large-scale half destruction" in the past disaster. The third image display area 58 is an area for displaying the disaster image corresponding to the determination result in which the damage category is lower than the provisional damage determination result by one stage. Each of the images IM7 and IM8 in FIG. 6 represents an example of an image determined to be "semi-half destruction" in the past disaster.

Similarly to the first image display area 54, in each of the image display areas of the second image display area 56 and the third image display area 58, the image can be scrolled by scroll bars 64 and 65. It should be noted that the image may be scrolled for each image display area by a swipe operation or a flick operation instead of or in combination with the scroll bars 61, 64, and 65.

Moreover, by pressing a specific image from a plurality of images displayed on the screen, the image can be displayed in an enlarged manner independently.

In FIG. 6, the image display area is divided into three areas, and examples of the houses of "half destruction", "large-scale half destruction", and "semi-half destruction" are displayed simultaneously on one screen, but the examples thereof may be displayed on separate screens. For example, in a case in which a title icon 66 of "example of the house determined to be "half destruction"" in the first image display area 54 is pressed, only a plurality of image examples of the house determined to be "half destruction" may be displayed in one screen or separate windows. Similarly, in a case in which a title icon 67 in the second image display area 56 or a title icon 68 in the third image display area 58 is tapped, only a plurality of image examples corresponding to the respective titles may be displayed in one screen or in separate windows.

The investigator can check the validity of the provisional damage determination result input to the damage determination result input box 52 with reference to the past disaster images corresponding to the provisional damage determination result and the determination results before and after the provisional damage determination result.

The display screen 50 includes an OK button 69 for inputting an instruction for executing the registration of the damage determination result. The OK button 69 may be rephrased as a "damage determination result registration execution button" or a "damage determination result approval button". The investigator who has referred to the past disaster images presses the OK button 69 in a case in which the provisional damage determination result input to the damage determination result input box 52 is determined to be valid, and transmits the instruction for executing the registering the damage determination result.

Example 2 of Display Screen in Terminal Apparatus 20

Figure 7:
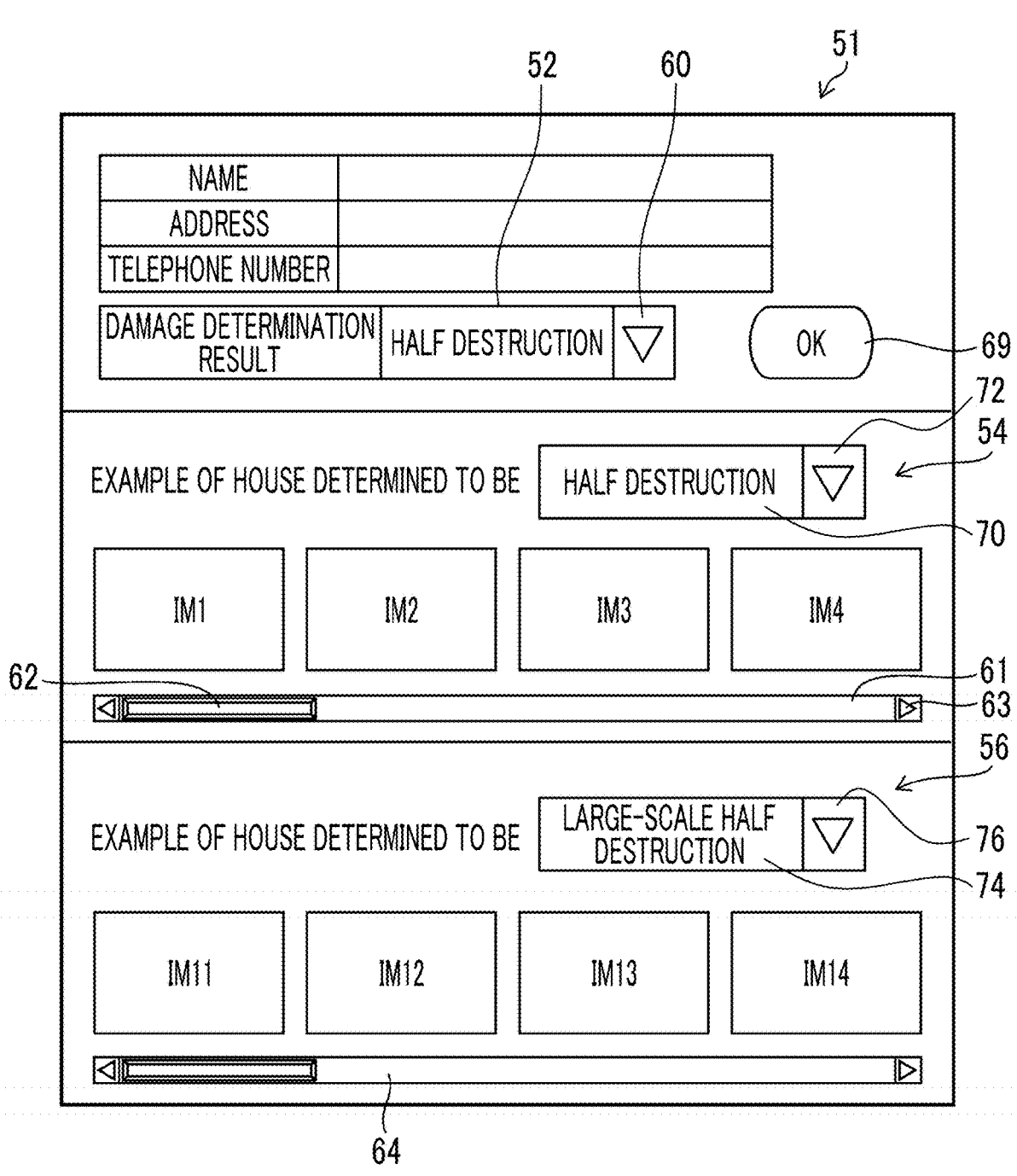
FIG. 7 is another example of the screen displayed on the display device of the terminal apparatus.

FIG. 7 is another example of the screen displayed on the display device 216 of the terminal apparatus 20. Instead of the display screen 50 shown in FIG. 7, a display screen 51 shown in FIG. 7 may be applied. In FIG. 7, the same reference numerals are given to elements having the same configurations as those shown in FIG. 6, and the description thereof will be omitted. A point of the configuration shown in FIG. 7 different from FIG. 6 will be described.

The first image display area 54 of the display screen 51 shown in FIG. 7 includes a degree-of-damage designation box 70 for designating the category of the degree of damage and a pull-down button 72. The degree-of-damage designation box 70 and the pull-down button 72 may be the same as the damage determination result input box 52 and the pull-down button 72. The input content of the damage determination result input box 52 is automatically reflected as the initial input content of the degree-of-damage designation box 70. Therefore, in a case in which the provisional damage determination result (for example, "half destruction") is input in the damage determination result input box 52, an example of the disaster image corresponding to the input provisional damage determination result is displayed in the first image display area 54. Thereafter, the user can select the desired category of the degree of damage from the pull-down button 72 to display the disaster image having the damage determination result related to the selection in the first image display area 54.

Similarly, the second image display area 56 of the display screen 51 includes a degree-of-damage designation box 74 and a pull-down button 76. In the degree-of-damage designation box 74, the damage determination result of the degree of damage higher than the provisional damage determination result input to the damage determination result input box 52 by one stage is automatically reflected as the initial input content. Therefore, in a case in which the provisional damage determination result (for example, "half destruction") is input in the damage determination result input box 52, an example of the disaster image corresponding to the degree of damage (here, "large-scale half destruction")

higher than the input provisional damage determination result by one stage is displayed in the second image display area 56. Each of the images IM11 to IM14 in FIG. 7 represents an example of an image determined to be "large-scale half destruction" in the past disaster. Thereafter, the user can select the desired category of the degree of damage from the pull-down button 76 to display the disaster image having the damage determination result related to the selection in the second image display area 56.

With the display screen 51 as shown in FIG. 7, it is possible to confirm an example of the disaster image having the degree of damage equal to and/or close to the provisional damage determination result in response to the input of the provisional damage determination result. It should be noted that the category of the degree of damage automatically displayed in conjunction with the input of the provisional damage determination result may be preset as described above or may be able to be appropriately set by the user.

Example 3 of Display Screen in Terminal
Apparatus 20

Figure 8:
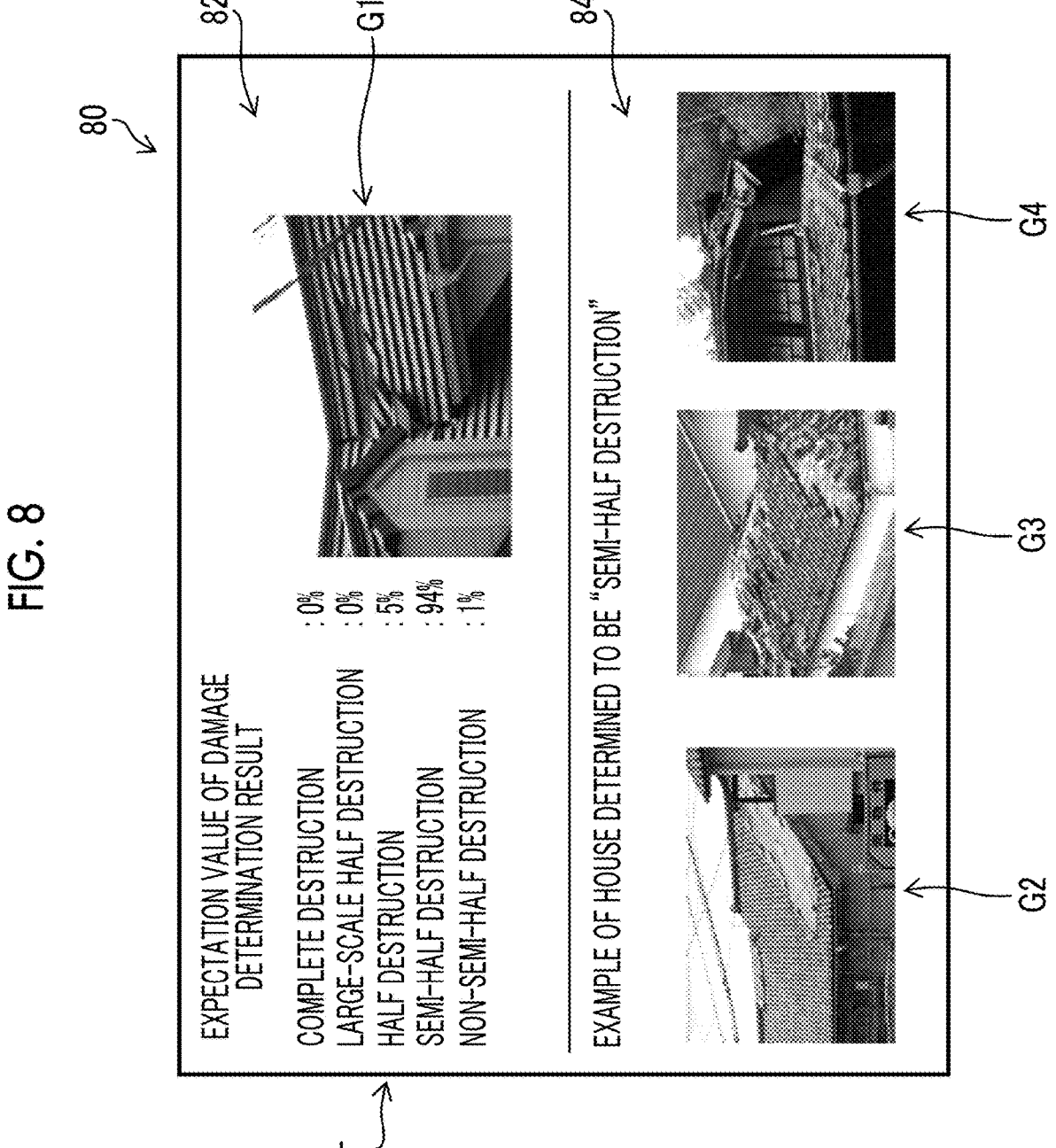
FIG. 8 is still another example of the screen displayed on the display device of the terminal apparatus.

FIG. 8 is still another example of the screen displayed on the display device 216 of the terminal apparatus 20. FIG. 8 is an example of a display screen 80 that displays information including the estimation result by the AI that estimates the damage determination result. In a case in which the damage determination result is estimated using the AI, information including the estimation result and an example of the disaster image corresponding to the estimated damage determination result can be displayed on the display device 216 of the terminal apparatus 20.

The display screen 80 of the estimation result by the AI includes an estimation result display area 82 and an image display area 84. In the estimation result display area 82, a list T of the prediction values of the damage determination results by the AI and an image G1 of the target building input to the AI are displayed.

In the list T, the probability values of "complete destruction", "large-scale half destruction", "half destruction", "semi-half destruction", and "non-semi-half destruction" are presented as expectation values of the damage determination result. Here, the probability value of the complete destruction is 0%, the probability value of the large-scale half destruction is 0%, the probability value of the half destruction is 5%, the probability value of the semi-half destruction is 94%, and the probability value of the non-semi-half destruction is 1%. As described above, by presenting the probability value of each damage determination result, it is possible to leave room for the determination of the resident regarding the application for the secondary investigation.

Moreover, in the image display area 84, an example of an image of the house determined to have the same degree of damage as the damage determination result having the highest probability value indicated by the estimation result by the AI is displayed. Here, since the probability value of "semi-half destruction" is the highest in the list T, an image G2, an image G3, and an image G4 of the house determined to be "semi-half destruction" in the past disaster are displayed as the house determined to have the same degree of damage. The image displayed in the image display area 84 may be the image extracted from the disaster image database 15. As described above, by displaying the example of the image of the house determined to have the same degree of damage as the target building together with the estimation result, it is expected that the convincing feeling of the resident for the estimation result of the AI will be increased.

Program Causing Computer to Operate

The program causing the computer to realize a part or all of the various processing functions in the server device 10 and the terminal apparatus 20 described in the embodiment can be recorded in a computer-readable medium that is a tangible non-transitory information storage medium, such as an optical disk, a magnetic disk, a semiconductor memory, or the like, and the program can be provided through the information storage medium.

In addition, instead of the aspect in which the program is stored in such a tangible non-transitory computer-readable medium and provided, a program signal can be provided as a download service by using an electric telecommunication line, such as the Internet.

Hardware Configuration of Each Processing Unit

The hardware structures of the processing units that execute various processing, such as the provisional damage determination result input unit 12, the image search unit 14, the damage determination result registration unit 16, the image display unit 24, and the damage determination result input unit 26 described in FIG. 1 are various processors as shown below.

The various processors include the CPU that is a general-purpose processor that executes the program and functions as the various processing units, the GPU that is a processor specialized in the image processing, a programmable logic device (PLD) that is a processor of which a circuit configuration can be changed after manufacture, such as a field programmable gate array (FPGA), and a dedicated electric circuit that is a processor having a circuit configuration designed for exclusive use to execute specific processing, such as an application specific integrated circuit (ASIC).

One processing unit may be configured by one of these various processors or may be configured by two or more processors of the same type or different types. For example, one processing unit may be configured by a plurality of FPGAs, a combination of a CPU and an FPGA, or a combination of a CPU and a GPU. Moreover, a plurality of the processing units may be configured by one processor. As an example in which the plurality of processing units are configured by one processor, first, there is a form in which one processor is configured by a combination of one or more CPUs and software and the processor functions as the plurality of processing units, as represented by a computer of a client or a server. Second, as represented by a system on chip (SoC) or the like, there is a form in which a processor that realizes the functions of the entire system including the plurality of processing units with one integrated circuit (IC) chip is used. As described above, various processing units are configured by one or more of the various processors described above as the hardware structure.

Further, the hardware structure of these various processors is, more specifically, an electric circuit (circuitry) in which circuit elements, such as semiconductor elements, are combined.

Advantages of Present Embodiment

The damage determination information system 1 according to the embodiment of the present invention has the following advantages.

[1] The investigator can refer to the past disaster images of the determination results similar to the provisional damage determination result on the display device of the mobile terminal apparatus 20A, and can confirm the validity of the provisional damage determination result. As a result, the investigator can settle the degree of damage to the target building with the convincing feeling.

[2] By using the damage determination information system 1, the investigator can determine a valid damage determination result by himself/herself, the inquiries to the coordinator can be reduced, and the investigation time can be shortened.

[3] Further, it is expected that the fluctuation of the determination results between the investigators is decreased by using the damage determination information system 1 by a plurality of investigators.

[4] Moreover, the damage determination information system 1 can present, to the resident, a specific example (previous example) of a relationship between the disaster image and the damage determination result in the past disaster that can be compared with the degree of damage of the target building. Therefore, the resident can determine the validity of his/her damage determination result while confirming the past case, can settle the damage determination result with the convincing feeling, and can determine the necessity of the secondary investigation.

Others

In the embodiment described above, the damage determination of the residence damage certification investigation has been described, but the application range of the technology of the present disclosure is not limited to this example, and the technology of the present disclosure can be widely applied to a case in which the damage determination is performed for the disaster-stricken building, and various aspects can be applied regarding the classification of the degree of damage and the number of categories (number of stages). For example, the damage determination information system according to the present disclosure can be applied even in a case in which the damage determination is performed in a disaster insurance investigation or the like. The terminal apparatus in this case may be a computer connected to an in-house network of an insurance company.

In the embodiment of the present invention described above, the configurations can be appropriately changed or added without departing from the spirit of the present invention. The present invention is not limited to the embodiment described above, and various modifications can be made by a person having ordinary knowledge in the field within the technical idea of the present invention.

EXPLANATION OF REFERENCES

1: damage determination information system
10: server device
12: provisional damage determination result input unit
14: image search unit
15: disaster image database
16: damage determination result registration unit
17: damage investigation result database
20: terminal apparatus
20A: mobile terminal apparatus
20B: personal computer (PC)
24: image display unit
26: damage determination result input unit
30: network 32: wide area communication line
50, 51: display screen
52: damage determination result input box
54: first image display area
56: second image display area
58: third image display area
60: pull-down button
61: scroll bar
62: knob
63: arrow
64, 65: scroll bar
66, 67, 68: title icon
69: OK button
70: degree-of-damage designation box
72: pull-down button
74: degree-of-damage designation box
76: pull-down button
80: display screen
82: estimation result display area
84: image display area
102: processor
104: computer-readable medium
106: communication interface
108: input/output interface
110: bus
114: input device
116: display device
130: damage determination result estimation program
134: image search program
136: damage determination result registration program
202: processor
204: computer-readable medium
206: communication interface
208: input/output interface
210: bus
214: input device
216: display device
222: provisional damage determination result input UI program
224: search result image display processing program
226: damage determination result input UI program
IM1 to IM8, IM11 to IM14: image
G1 to G4: image
S11 to S17: operation step of damage determination information system

What is claimed is:

1. A damage determination information system comprising:

a server device that manages a damage determination result of a disaster-stricken building and a disaster image which corresponds to the damage determination result and in which the disaster-stricken building is imaged; and a terminal apparatus connected to the server device via a network, wherein the server device includes a first processor, and a disaster image database that stores the damage determination result and the disaster image in association with each other, the terminal apparatus includes a second processor, a display device, and an input device, the first processor acquires a provisional damage determination result, extracts a plurality of the disaster images related to the provisional damage determination result from the disaster image database based on the acquired provisional damage determination result, and provides the extracted plurality of disaster images to the terminal apparatus, the second processor displays, on the display device, a display screen including:

an input box for inputting a provisional damage determination result;

a first image display area for displaying the disaster image corresponding to the provisional damage determination result; and a second image display area for displaying at least one disaster image of the disaster image corresponding to a determination result of a same degree of damage as the provisional damage determination result, the disaster image corresponding to a determination result of which a category of a degree of damage is higher than the provisional damage determination result by one stage, or the disaster image corresponding to a determination result of which a category of a degree of damage is lower than the provisional damage determination result by one stage, and receives input of an instruction for settling the damage determination result from the input device, and the first processor registers the settled damage determination result in a damage investigation result database based on an instruction from the terminal apparatus that displays the plurality of disaster images on the display device.

2. The damage determination information system according to claim 1, wherein the provisional damage determination result is input from the input device of the terminal apparatus.

3. The damage determination information system according to claim 1, wherein at least one of the first processor or the second processor acquires the provisional damage determination result by image recognition from an image showing a target building of a damage determination.

4. The damage determination information system according to claim 1, wherein at least one of the first processor or the second processor performs damage determination result estimation processing of using, as input, an image showing a target building of a damage determination and building information related to a structure and a portion of the target building to output a damage classification of the portion, and an estimation result of the damage determination result estimation processing is used as the provisional damage determination result.

5. The damage determination information system according to claim 4, wherein at least one of the first processor or the second processor includes a trained model that has been subjected to machine learning processing to output the damage classification estimated for the portion of the target building in a case in which the image showing the target building and the building information related to the structure and the portion of the target building are input.

6. The damage determination information system according to claim 1, wherein a damage category in a damage determination criterion is defined in a plurality of stages according to a degree of damage, and the plurality of disaster images related to the provisional damage determination result include the disaster image belonging to a damage category of a degree of damage equal to or higher than an input provisional damage determination result.

7. The damage determination information system according to claim 6, wherein the plurality of disaster images related to the provisional damage determination result include the disaster image belonging to a damage category of the same degree of damage as the input provisional damage determination result and the disaster image belonging to a damage category of which the degree of damage is higher than the provisional damage determination result by one stage.

8. A server device comprising:

a disaster image database that stores a damage determination result of a disaster-stricken building and a disaster image which corresponds to the damage determination result and in which the disaster-stricken building is imaged, in association with each other; and a first processor, wherein the first processor acquires a provisional damage determination result, extracts a plurality of the disaster images related to the provisional damage determination result from the disaster image database based on the acquired provisional damage determination result, provides the extracted plurality of disaster images to a terminal apparatus connected via a network, and registers a settled damage determination result in a damage investigation result database based on an instruction from the terminal apparatus that displays the plurality of disaster images, and a display screen is displayed on a display device of the terminal apparatus, the display screen including:

an input box for inputting the provisional damage determination result, a first image display area for displaying the disaster image corresponding to the provisional damage determination result, and a second image display area for displaying at least one disaster image of the disaster image corresponding to a determination result of a same degree of damage as the provisional damage determination result, the disaster image corresponding to a determination result of which a category of a degree of damage is higher than the provisional damage determination result by one stage, or the disaster image corresponding to a determination result of which a category of a degree of damage is lower than the provisional damage determination result by one stage.

9. A terminal apparatus that is connected to a server device via a network, wherein the server device comprises:

a disaster image database that stores a damage determination result of a disaster-stricken building and a disaster image which corresponds to the damage determination result and in which the disaster-stricken building is imaged, in association with each other, and a first processor, the first processor acquires a provisional damage determination result, extracts a plurality of the disaster images related to the provisional damage determination result from the disaster image database based on the acquired provisional damage determination result, provides the extracted plurality of disaster images to the terminal apparatus connected via the network, and registers a settled damage determination result in a damage investigation result database based on an instruction from the terminal apparatus that displays the plurality of disaster images, the terminal apparatus comprises:

a second processor, a display device, and an input device, the second processor displays, on the display device, a display screen including:

an input box for inputting a provisional damage determination result;

a first image display area for displaying the disaster image corresponding to the provisional damage determination result; and a second image display area for displaying at least one disaster image of the disaster image corresponding to a determination result of a same degree of damage as the provisional damage determination result, the disaster image corresponding to a determination result of which a category of a degree of damage is higher than the provisional damage determination result by one stage, or the disaster image corresponding to a determination result of which a category of a degree of damage is lower than the provisional damage determination result by one stage, and receives input of an instruction for settling the damage determination result from the input device.

10. A non-transitory, computer-readable tangible recording medium which records thereon a program for causing, when read by a computer, the computer to realize:

a function of managing a disaster image database that stores a damage determination result of a disaster-stricken building and a disaster image which corresponds to the damage determination result and in which the disaster-stricken building is imaged, in association with each other;

a function of acquiring a provisional damage determination result;

a function of extracting a plurality of the disaster images related to the provisional damage determination result from the disaster image database based on the acquired provisional damage determination result;

a function of providing the extracted plurality of disaster images to a terminal apparatus connected via a network; and a function of registering a settled damage determination result in a damage investigation result database based on an instruction from the terminal apparatus after the disaster image is displayed on a display device of the terminal apparatus, wherein a display screen is displayed on the display device, the display screen including:

an input box for inputting a provisional damage determination result, a first image display area for displaying the disaster image corresponding to the provisional damage determination result, and a second image display area for displaying at least one disaster image of the disaster image corresponding to a determination result of a same degree of damage as the provisional damage determination result, the disaster image corresponding to a determination result of which a category of a degree of damage is higher than the provisional damage determination result by one stage, or the disaster image corresponding to a determination result of which a category of a degree of damage is lower than the provisional damage determination result by one stage.

11. A non-transitory, computer-readable tangible recording medium which records thereon a program for causing, when read by a computer, the computer to function as a terminal apparatus connected to a server device that manages a damage determination result of a disaster-stricken building and a disaster image which corresponds to the damage determination result and in which the disaster-stricken building is imaged, via a network, the program causing the computer to realize:

a function of acquiring a provisional damage determination result;

a function of transmitting the acquired provisional damage determination result to the server device;

a function of acquiring a plurality of the disaster images related to the provisional damage determination result from the server device to display, on a display device, a display screen including:

an input box for inputting a provisional damage determination result, a first image display area for displaying the disaster image corresponding to the provisional damage determination result, and a second image display area for displaying at least one disaster image of the disaster image corresponding to a determination result of a same degree of damage as the provisional damage determination result, the disaster image corresponding to a determination result of which a category of a degree of damage is higher than the provisional damage determination result by one stage, or the disaster image corresponding to a determination result of which a category of a degree of damage is lower than the provisional damage determination result by one stage; and a function of receiving input of an instruction for settling the damage determination result after the disaster image is displayed.

12. The damage determination information system according to claim 1, wherein the disaster image database includes a data group that stores a settled damage determination result for a disaster-stricken building in a past disaster and a disaster image which corresponds to the damage determination result and in which the disaster-stricken building is imaged, in association with each other, and the plurality of disaster images related to the provisional damage determination result extracted from the disaster image database are disaster images of a disaster-stricken building that is different from a target building of a damage determination, the disaster images being associated with a settled damage determination result.

13. The server device according to claim 8, wherein the disaster image database includes a data group that stores a settled damage determination result for a disaster-stricken building in a past disaster and a disaster image which corresponds to the damage determination result and in which the disaster-stricken building is imaged, in association with each other, and the plurality of disaster images related to the provisional damage determination result extracted from the disaster image database are disaster images of a disaster-stricken building that is different from a target building of a damage determination, the disaster images being associated with a settled damage determination result.

14. The non-transitory, computer-readable tangible recording medium according to claim 10, wherein the disaster image database includes a data group that stores a settled damage determination result for a disaster-stricken building in a past disaster and a disaster image which corresponds to the damage determination result and in which the disaster-stricken building is imaged, in association with each other, and the plurality of disaster images related to the provisional damage determination result extracted from the disaster image database are disaster images of a disaster-stricken building that is different from a target building of a damage determination, the disaster images being associated with a settled damage determination result.

\* \* \* \* \*